United States Patent [19]

Jensen

[11] Patent Number: 5,026,023

[45] Date of Patent: Jun. 25, 1991

[54] SEALING ARRANGEMENT IN A PLUG-AND-SOCKET COUPLING WITH A PRESSURE FLUID PASSAGE, PARTICULARLY BETWEEN THE SPOUT OF A LIQUID GAS CONTAINER AND A DISCHARGE REGULATOR MOUNTED THEREON

[75] Inventor: Ove Jensen, Ålsgårde, Denmark

[73] Assignee: Kosan Teknova A/S, Niva, Denmark

[21] Appl. No.: 472,411

[22] Filed: Jan. 31, 1990

Related U.S. Application Data

[63] Continuation of Ser. No. 190,411, May 5, 1988, abandoned.

[30] Foreign Application Priority Data

May 21, 1987 [DK] Denmark ............................ 2572/87

[51] Int. Cl.[5] ............................................. F16K 51/00

[52] U.S. Cl. ....................................... 251/144; 222/3; 222/509; 222/542; 251/148; 277/27; 277/176; 277/177; 285/95

[58] Field of Search ............... 141/20; 251/144, 144.9, 251/148; 220/304; 285/95; 277/176, 177, 27; 222/542, 3, 509

[56] References Cited

U.S. PATENT DOCUMENTS

| | | | |
|---|---|---|---|
| 2,395,095 | 2/1946 | Brody, Jr. | 277/89 X |
| 2,401,379 | 6/1946 | Smith | 277/117 |
| 2,431,437 | 11/1947 | Van Der Werff | 251/900 X |
| 2,583,291 | 1/1952 | Beem | 251/900 X |
| 2,599,622 | 6/1952 | Folmbee | 251/900 X |
| 2,768,011 | 10/1956 | Mosher | 277/93 X |
| 2,841,190 | 7/1958 | Scheck | 141/20 |
| 2,872,221 | 2/1958 | Burns et al. . | |
| 3,006,667 | 10/1961 | Stephens | 277/93 X |
| 3,522,928 | 8/1970 | Henriques | 251/144 |
| 3,674,290 | 7/1972 | McNally | 285/375 X |
| 3,784,063 | 1/1974 | Otis et al. | 222/394 |
| 4,015,631 | 4/1977 | Hayes | 251/900 X |
| 4,407,482 | 10/1983 | Daghe etal. . | |
| 4,474,358 | 10/1984 | Bennett | 251/900 X |
| 4,550,746 | 11/1985 | Hansen et al. . | |

FOREIGN PATENT DOCUMENTS

| | | | |
|---|---|---|---|
| 2929351 | 2/1981 | Fed. Rep. of Germany . | |
| 3233182 | 4/1983 | Fed. Rep. of Germany . | |
| 901117 | 7/1945 | France | 222/394 |
| 2115613 | 6/1972 | France . | |
| 2543658 | 10/1984 | France . | |
| 423745 | 5/1982 | Sweden . | |
| 435445 | 10/1984 | Sweden . | |

OTHER PUBLICATIONS

Exhibit A: Sketch of a structure in public use before the date of the present invention.

*Primary Examiner*—Allan N. Shoap
*Attorney, Agent, or Firm*—Banner, Birch, McKie & Beckett

[57] ABSTRACT

In a plug-and-socket coupling, particularly between a spout of a portable liquid gas container and a regulator mounted thereon, in which the first coupling part has a discharge outlet adapted to receive a stud or protrusion of the second coupling part, leakage to the surroundings from a pressure fluid passage through the coupling is impeded by an annular gasket movably disposed within an annular chamber between the stud and a surrounding skirt. Between the gasket and the stud there is a passge for pressure fluid to the annular chamber behind the gasket for loading the gasket to closely but against the internal surface of the skirt and a surface on the first coupling part.

13 Claims, 1 Drawing Sheet

SEALING ARRANGEMENT IN A PLUG-AND-SOCKET COUPLING WITH A PRESSURE FLUID PASSAGE, PARTICULARLY BETWEEN THE SPOUT OF A LIQUID GAS CONTAINER AND A DISCHARGE REGULATOR MOUNTED THEREON

This application is a continuation of application Ser. No. 190,411, filed May 5, 1988, now abandoned.

FIELD OF THE INVENTION

This invention relates to a sealing arrangement in a two-part plug-and-socket coupling with a pressure fluid passage, particularly between the spout of a liquid gas container and a discharge regulator mounted thereon. A first coupling part accommodates a valve to be opened upon assembling of the coupling, a second part is provided with a protrusion to be inserted into the inlet of the pressure fluid passage of the first coupling part, and an annular gasket is provided in one of the coupling parts.

BACKGROUND OF THE INVENTION

In an arrangement of said type, used e.g. in connection with portable liquid gas containers, the pressure fluid passage of the container spout, i.e. of the first coupling part, discharges through a bore, the diameter of which is only a little larger than the diameter of the portrusion of the second coupling part. An O-ring is provided to perform sealing around the protrusion in the assembled state of the coupling. For this purpose, it is a condition that the O-ring fits tightly around the protrusion. The O-ring will, thus, be exposed to a certain wear any time the protrusion is forced into and is pulled clear of the mouth of the container spout. The higher the fluid pressure which the O-ring is to seal against, the tighter the O-ring must fit about the protrusion, since the pressurized fluid seeks to leak through the joint between the annular gasket and the protrusion.

SUMMARY OF THE INVENTION

The sealing arrangement according to the invention differs from the prior embodiment in that the annular gasket is axially displaceable within an annular chamber that is provided in the second coupling part between the protrusion and a surrounding skirt and which is open in the direction towards the first coupling part. The annular gasket is in close abutment on the internal surface of the skirt while access for the pressure fluid is provided between the gasket and the protrusion to the annular chamber behind the gasket.

In this case, the annular gasket may be spaced from the protrusion of the second coupling part. Thus, prior to the eventual assembling of the coupling, it may have only a slight pressure against the internal surface of the skirt, thereby almost completely preventing it from being exposed to mechanical wear. This is due to the fact that the sealing effect of the annular gasket after the coupling parts have been joined depends on the circumstance that the pressure fluid leaking out around the protrusion inserted into the mouth will be caught in the annular chamber behind the annular gasket. This annular gasket is thereby urged firmly against the internal surface of the skirt as well as against the end surface around the mouth of the fluid flow passage of the first coupling part. This causes the annular gasket to effectively obstruct the joint left between the skirt and the end surface and which constitutes the only possible leakage way of the pressure fluid. When disassembling the coupling parts, the annular gasket will again be relieved of the fluid pressure responsible for the obstructing effect so that no considerable wear will occur in this phase.

DETAILED DESCRIPTION OF THE PREFERRED EMBODIMENT

Figure 1:
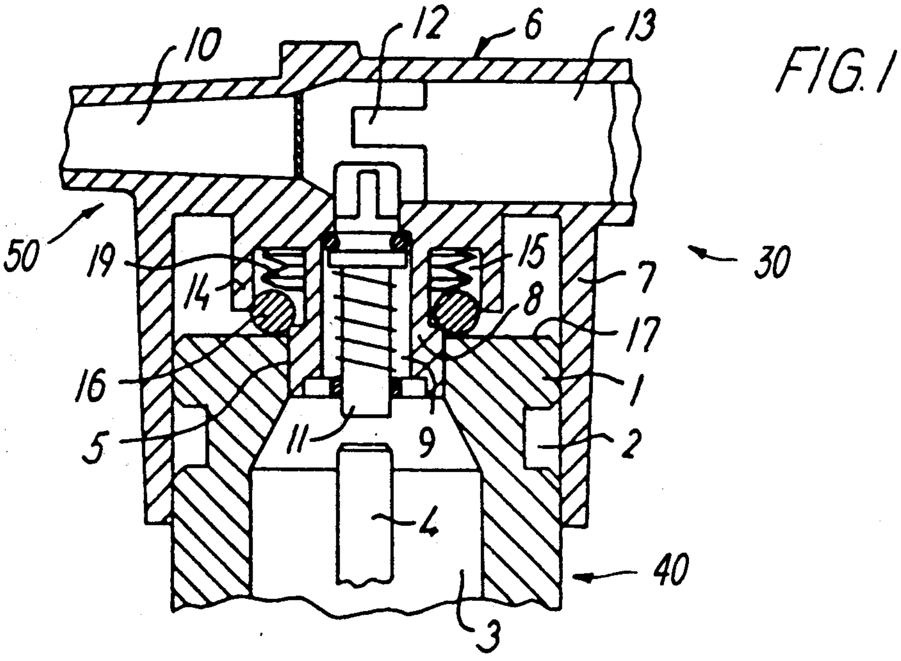
FIG. 1 illustrates a preferred embodiment of the invention by showing the components, relevant in the present context, of the discharge spout of a liquid gas container and a discharge regulator while being mounted, but not yet completely tightened up.

The drawing illustrates the top portion 1 of a spout representing the plug or first part 40 of a plug-and-socket coupling 30 and disposed to be firmly stuck in a portable liquid gas container (not shown). This first port 40 in an ordinary way is provided with an external circumferential groove 2 and a channel or flow passage 3 accommodating a self-closing valve member (not shown) provided with a control spindle 4. At its top, the passage has a narrowed outlet in the form of a bore 5.

An associated regulator 6 which represents the socket or second part 50 of the coupling and may accommodate a diaphragm-operated reduction valve (not shown) includes an annular collar 7 adapted to be pushed down over the top of the spout 1 and supposed to be provided with locking means, for instance balls or hooks, for engagement with the annular groove 2 of the container spout. Such a locking arrangement is known in various forms and is, therefore, not shown in the drawing.

The regulator or control device 6 includes, moreover, a central stud or protrusion 8 which with a suitably small clearance may be received in bore 5 of spout 1 and which itself has a bore 9 establishing a connection between the passage 3 of the spout and a discharge channel 10 with a filter in the regulator 6. In a manner also known, the bore 9 accommodates a displaceable valve opener 11 that is spring-biassed in the upward direction and which may be pressed downwards against the spring force by means of an eccentric cam 12 at the end of a manually operated shaft 13.

The regulator 6 also has a skirt 14 encircling the stud 8 and defining together therewith a downwardly open annular chamber 15. The radial width of the chamber 15 is somewhat larger than the cross-sectional diameter of the annual gasket 16. Gasket 16 is illustrated as an O-ring, but it may as well have another cross-sectional shape which in its mounting position abuts slidingly against the internal surface of the skirt 14 the lower edge of which, in this position, is located at some distance above the top surface 17 of spout 1. The annular gasket 16 is squeezed into the annular chamber 15 through the somewhat narrowed slit between the lower edge of the skirt 14 and a shoulder 18 formed on the stud 8 and against which the gasket is urged by a spring 19. Spring 19 is illustrated as a bellows, but it may be of any other type as well. In the mounting position, the gasket 16 may thereby be kept clear of the top surface 17 of the spout, against which it abuts upon tightening up the regulator 6; see the right side of FIG. 2.

Figure 2:
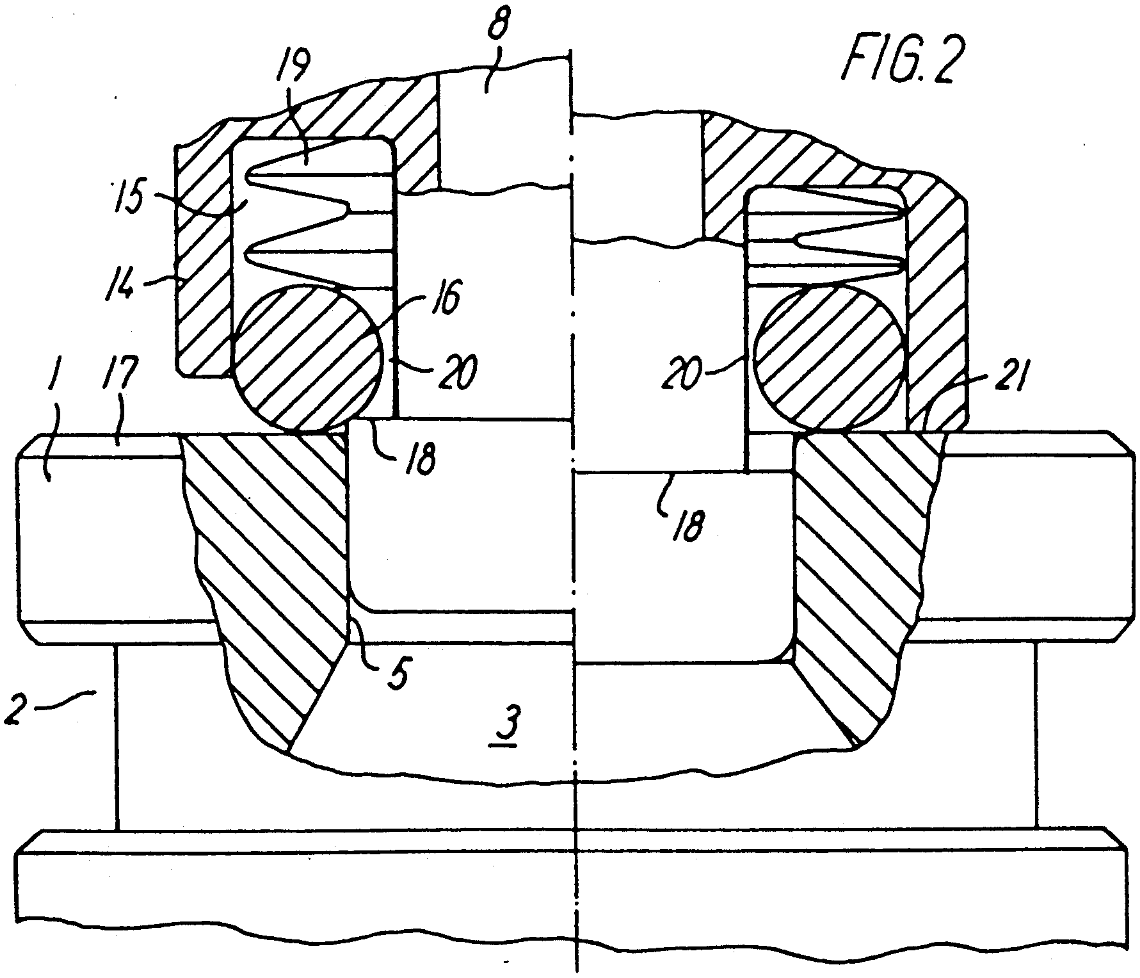
FIG. 2 is a part of FIG. 1 on a larger scale and with the components to the left of the illustration in the same situation as in FIG. 1, while the components to the right are shown after the regulator has been fully tightened up.

Between the annular gasket 16 and the stud 8, a narrow space 20 is left, see FIG. 2, which, after the valve member with the spindle 4 has been opened, allows pressure fluid that leaks out through the joint around the end of the stud 8 inserted into the bore, to penetrate into the annular chamber 15 behind the gasket 16. This urges said gasket outwardly towards the skirt as well as downwardly towards the top surface 17 so that the joint 21 between said components is effectively obstructed. Thus, preventing pressure fluid from leaking out this way. This also applies in case the skirt is not tightened up to abut firmly against the container spout, as supposed in FIG. 2.

Various modifications of the details illustrated in the drawings having already been mentioned above, but other modifications may obviously also be made. Instead of the self-closing valve member with the spindle 4, a manual valve may for instance be used so that the valve opener 11 becomes superfluous. This will particularly be the case in alternative applications of the sealing arrangement dealt with, e.g. in pneumatic systems or liquid conduits. Moreover, the pressure fluid access past the gasket 16 may be ensured in another way than shown, for instance by grooves in the gasket or in the stud.

I claim:

1. A sealing arrangement in a plug-and-socket coupling comprising:
- a first coupling part having a first pressure fluid passage and including:
  - a valve to be opened upon assembling of the sealing arrangement;
  - a top surface surrounding an axis; and
  - a bore defining an outlet for the first pressure fluid passage which opens at the top surface of the first coupling part;
- a second coupling part having a main body with a second pressure fluid passage, said body engaging an outer periphery of the first coupling part adjacent said top surface of said first coupling part and including:
  - a protrusion surrounding said axis and partly inserted into and with a small clearance fitting the bore of the outlet of the first coupling part so that a non-inserted part extends axially away from said top surface and said first coupling part; and
  - a skirt disposed radially inwardly of the outer periphery of the first coupling part, encircling substantially the non-inserted part of the protrusion, and including an internal surface facing the protrusion, which together with the non-inserted part of the protrusion defines a downwardly open annular chamber facing said top surface; and
- an annular gasket within the annular chamber and abutting the internal surface of the skirt, the gasket being axially displaceable relative to the internal surface of the skirt and the protrusion, while access for pressurized fluid from the outlet of the first pressure fluid passage of the first coupling part to the annular chamber is provided between the gasket and the protrusion so that pressurized fluid leaking past the inserted part of the protrusion, between the protrusion and the bore of said outlet, enters the annular chamber and presses the annular gasket sealingly against the internal surface of the skirt and the top surface of the first coupling part.

2. A sealing arrangement as in claim 1, further comprising means for substantially retaining the annular gasket in the annular chamber.

3. A sealing arrangement as in claim 2, further comprising means for biasing the annular gasket downwardly towards an open mouth of the annular chamber.

4. A sealing arrangement as in claim 3, wherein the retaining means further comprises a shoulder on said protrusion, said shoulder defining a first portion of the protrusion, which is fully inserted in the bore of the outlet of first coupling part in the assembled condition of the coupling, and a second portion of the protrusion having a smaller outside diameter than the first portion, and wherein the biasing means is a spring member.

5. A sealing arrangement as in claim 1, wherein the radial width of the chamber is greater than the cross-sectional width of the gasket.

6. A sealing arrangement as in claim 5, wherein the first and second coupling parts are, respectively, a spout of a liquid gas container and an associated discharge regulator to be mounted thereon.

7. A sealing arrangement as in claim 2, wherein the radial width of the chamber is greater than the cross-sectional width of the gasket.

8. A sealing arrangement as in claim 3, wherein the radial width of the chamber is greater than the cross-sectional width of the gasket.

9. A sealing arrangement as in claim 4, wherein the radial width of the chamber is greater than the cross-sectional width of the gasket.

10. A sealing arrangement as in claim 1, wherein the first and second coupling parts are, respectively, a spout of a liquid gas container and an associated discharge regulator to be mounted thereon.

11. A sealing arrangement as in claim 2, wherein the first and second coupling parts are, respectively, a spout of a liquid gas container and an associated discharge regulator to be mounted thereon.

12. A sealing arrangement as in claim 3, wherein the first and second coupling parts are, respectively, a spout of a liquid gas container and an associated discharge regulator to be mounted thereon.

13. A sealing arrangement as in claim 4, wherein the first and second coupling parts are, respectively, a spout of a liquid gas container and an associated discharge regulator to be mounted thereon.

* * * * *